(12) United States Patent
Park

(10) Patent No.: US 8,791,811 B2
(45) Date of Patent: Jul. 29, 2014

(54) SYSTEM AND METHOD OF CHANGING VEHICLE COLOR ACCORDING TO RISK

(75) Inventor: Seung Hwan Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 22 days.

(21) Appl. No.: 13/567,593

(22) Filed: Aug. 6, 2012

(65) Prior Publication Data

US 2013/0162447 A1  Jun. 27, 2013

(30) Foreign Application Priority Data

Dec. 26, 2011  (KR) .................. 10-2011-0142244

(51) Int. Cl.
*B60Q 1/26* (2006.01)
*B60Q 1/52* (2006.01)

(52) U.S. Cl.
USPC ..................... 340/468; 340/464; 340/471

(58) Field of Classification Search
USPC ......... 340/435, 436, 463, 464, 467, 468, 471, 340/479, 901, 903; 701/301; 348/148, 149; 367/101, 909; 180/169, 197
See application file for complete search history.

(56) References Cited

U.S. PATENT DOCUMENTS

| | | | | |
|---|---|---|---|---|
| 4,600,913 A | * | 7/1986 | Caine ........................... | 340/435 |
| 5,032,821 A | * | 7/1991 | Domanico et al. ............ | 340/440 |
| 5,173,881 A | * | 12/1992 | Sindle .......................... | 367/101 |
| 5,528,217 A | * | 6/1996 | Adams ......................... | 340/435 |
| 5,786,752 A | * | 7/1998 | Bucalo et al. ................ | 340/463 |
| 6,525,656 B1 | * | 2/2003 | Hahn ............................ | 340/463 |
| 7,375,627 B2 | * | 5/2008 | Johnson et al. .............. | 340/435 |
| 7,495,550 B2 | * | 2/2009 | Huang et al. ................. | 340/435 |
| 7,791,458 B2 | * | 9/2010 | Shimaoka et al. ........... | 340/435 |

FOREIGN PATENT DOCUMENTS

KR  10-2011-0090869 A  8/2011

* cited by examiner

*Primary Examiner* — Van T. Trieu
(74) *Attorney, Agent, or Firm* — Rabin & Berdo, P.C.

(57) ABSTRACT

Disclosed are a system of changing a vehicle color and a method of changing a vehicle color according to a risk of an accident. According to the present invention, a driver of a vehicle and a surrounding pedestrian and drivers of other vehicles can easily recognize a risk situation and take measurement according to the recognized risk situation, such that it is possible to safely drive the vehicle.

16 Claims, 5 Drawing Sheets

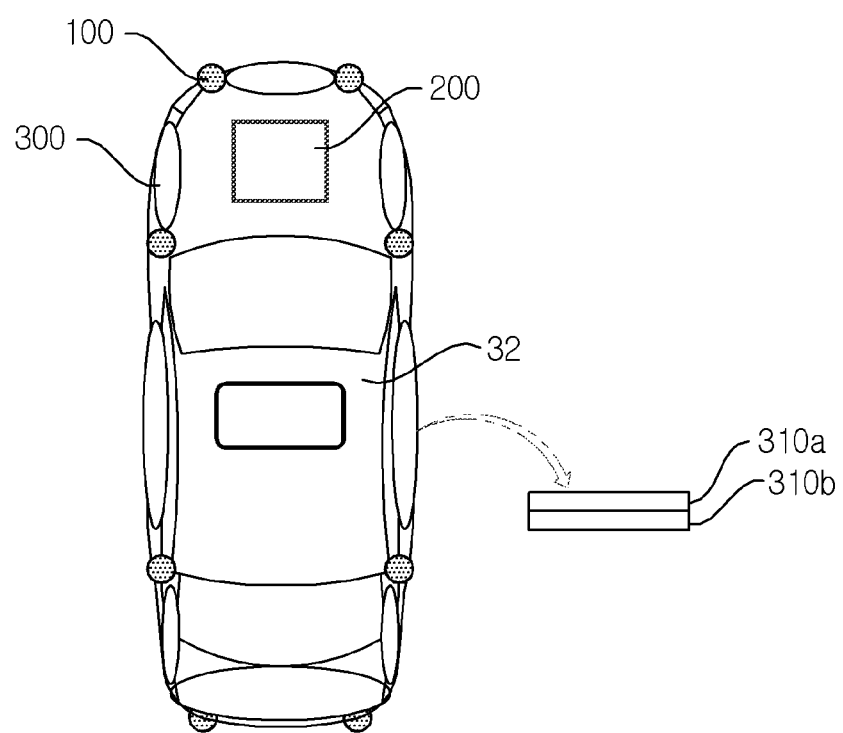

SYSTEM AND METHOD OF CHANGING VEHICLE COLOR ACCORDING TO RISK

CROSS-REFERENCE TO RELATED APPLICATIONS

This application claims priority to and the benefit of Korean Patent Application No. 10-2011-0142244 filed in the Korean Intellectual Property Office on Dec. 26, 2011, the entire contents of which are incorporated herein by reference.

TECHNICAL FIELD

The present invention relates to a technique for generating information on occurrence of a risk situation by using a risk designation algorithm while driving before an actual situation occurs, and more particularly, to a technique for partially changing a color of a vehicle appearance so that a driver and drivers of surrounding vehicles can easily observe the case where the driver performs any operation according to a situation while the vehicle is being driven, thereby safely driving the vehicle.

BACKGROUND ART

The risk of an accident is always present due to the emergence and operations of pedestrians, other vehicles, or various other obstacles while driving the vehicle. A situation where a driver of the vehicle or persons near the vehicle should normally be cautious may occur when moving backwards or parking. In this case, the driver usually drives the vehicle with attentiveness, and some vehicles with sensors may transmit an environmental situation depending on sensor information to the driver.

As a most representative method of transferring surrounding situation information to the driver, a method of sounding different alarms depending on a distance with a surrounding obstacle by mounting an ultrasonic sensor at the rear side or the lateral side of the vehicle is generally used. As video information is transferred to a user by using a rear camera, the user can acquire information regarding a portion which is visually hidden at the time of parking the vehicle. In recent years, the lateral sensor has been purposefully implemented, such that an apparatus, which sounds an alarm to the driver of the vehicle when a dynamic obstacle (a person or an object) makes a sudden movement in an alley, or partially controls the movement of the vehicle, has been launched, while being attached to the vehicle in some cases.

The apparatus can comparatively easily transmit information to the driver in the vehicle, but can never transmit the situational information to pedestrians outside the vehicle or drivers of other vehicles. The pedestrians or the drivers of other vehicles should actually recognize a situation in order to avoid an accident, and even though a sensor or an apparatus for notifying a risk element is not installed in other vehicles, the vehicle needs to originally transfer the information by any means. The pedestrians should be able to receive a risk depending on a situation of the vehicle and their own situation in order to allow the pedestrians to prevent an accident in advance.

SUMMARY OF THE INVENTION

The present invention has been made in an effort to provide a method of reducing a traffic accident and losses of both vehicle and life by measuring a risk for a surrounding situation while driving and emitting a specific color of illumination to a partial portion of the vehicle, in the case where a driver needs to perform a driving operation according to a level of risk to recognize the risk situation to persons around the vehicle including a driver of the vehicle.

An exemplary embodiment of the present invention provides a system of changing a vehicle color, including: an information acquiring sensor configured to acquire surrounding information including relative distance, position, and direction angle information with a surrounding environment of a vehicle; a risk measuring unit configured to determine a risk through the acquired surrounding information and dynamic information including velocity, acceleration, and a direction relating to the driving of the vehicle; a color determining unit configured to determine what color is expressed by using a predetermined algorithm for selecting a color to be expressed according to the measured risk; and a color emitting unit configured to express the determined color. The color determining unit may further include a position recognizing unit configured to determine whether possibility of a risk situation is high at any position around the vehicle by considering the acquired surrounding information and the determined risk, and the color determining unit may determine which color will be expressed for each position by using a predetermined algorithm according the determined position and the determined risk.

The information acquiring sensor may acquire image information by using a charge-coupled device (CCD), a complementary metal oxide semiconductor field effect transistor (CMOS), or a photodetector.

The information acquiring sensor may measure a distance from the vehicle to a surrounding object by using a laser or an ultrasound wave.

The information acquiring sensor may receive situation information from the surrounding vehicle or an infrastructure.

At least one information acquiring sensor may be attached to the outside of the vehicle to acquire the surrounding information.

The color emitting unit may be attached to the outside of the vehicle or included in the vehicle by replacing a part forming the appearance of the vehicle.

In the case where the color emitting unit is attached to the outside of the vehicle, the vehicle may further include a transparent layer capable of transmitting light on the outside of the vehicle, and the color emitting unit may be disposed at the lower portion of the transparent layer.

Another exemplary embodiment of the present invention provides a method of changing a vehicle color, including: an information acquiring step of acquiring surrounding information including relative distance, position, and direction angle information with a surrounding environment of a vehicle; a risk measuring step of determining a risk through the acquired surrounding information and dynamic information including velocity, acceleration, and a direction relating to the driving of the vehicle; a color determining step of determining what color is expressed by using a predetermined algorithm for selecting a color to be expressed according to the measured risk; and a color emitting step of expressing the determined color.

The color determining step may further include a position recognizing step of determining whether possibility of a risk situation is high at any position around the vehicle by considering the acquired surrounding information and the determined risk, and the color determining step may determine which color will be expressed for each position by using a predetermined algorithm according the determined position and the determined risk.

The information acquiring step may acquire image information by using a charge-coupled device (CCD), a complementary metal oxide semiconductor field effect transistor (CMOS), or a photodetector.

The information acquiring step may measure a distance from the vehicle to a surrounding object by using a laser or an ultrasound wave.

The information acquiring step may receive situation information from the surrounding vehicle or an infrastructure.

The information acquiring step may acquire the surrounding information through an information acquiring sensor, and at least one information acquiring sensor may be attached to the outside of the vehicle to acquire the surrounding information.

The color emitting step may express the color through a color emitting device, and the color emitting device may be attached to the outside of the vehicle or included in the vehicle by replacing a portion forming the appearance of the vehicle.

In the case where the color emitting device is attached to the outside of the vehicle, the vehicle may further include a transparent layer capable of transmitting light on the outside of the vehicle, and the color emitting device may be disposed at the lower portion of the transparent layer.

According to the exemplary embodiments of the present invention, it is possible to easily transfer information relating to a situation while driving a vehicle to a driver and surrounding persons, by applying a color changing device capable of being attached to the existing vehicle or being easily applied through replacement of the appearance of the vehicle, and using a sensor capable of acquiring information relating to a surrounding situation and a device capable of measuring a risk for a current situation based on the acquired surrounding situation. A driver of a vehicle, a surrounding pedestrian and drivers of other vehicles can easily recognize a risk situation and take measurements according to the recognized risk situation, such that it is possible to safely drive the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 3A and 3B are an exemplified diagram illustrating an example in which the system of changing a vehicle color according to the risk according to an exemplary embodiment of the present invention is applied to a vehicle.

Figure 1:
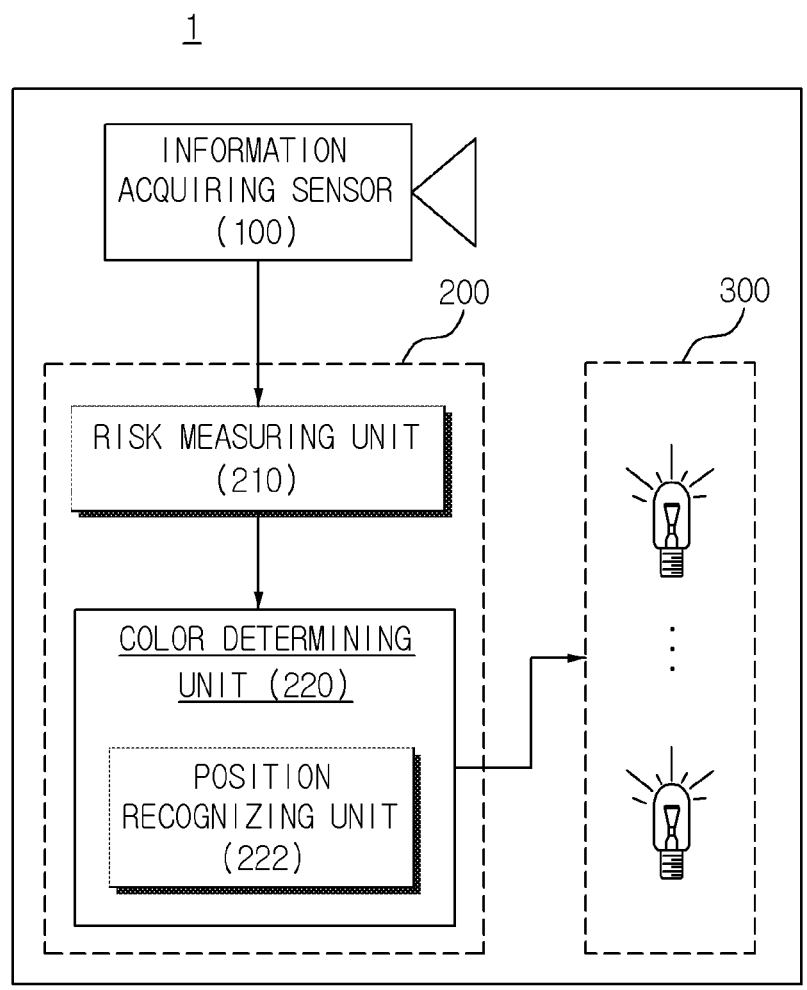
FIG. 1 is a block diagram illustrating a system of changing a vehicle color according to a risk according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a block diagram illustrating a system of changing a vehicle color according to a risk according to an exemplary embodiment of the present invention.

Referring to FIG. 1, a system 1 of changing a vehicle color according to the exemplary embodiment includes an information acquiring sensor 100, a color change controller 200, and a color emitting unit 300.

The information acquiring sensor 100 acquires surrounding information including relative distance, position, and direction angle information with a surrounding environment. The surrounding environment of the vehicle includes objects that affect how a vehicle is driven. In the exemplary embodiment, the surrounding environment includes other vehicles, roads, and road facilities, and pedestrians, and may include all other elements influencing the driving of the vehicle such as weather and the like.

The information acquiring sensor 100 may acquire image information by using a charge-coupled device (CCD), a complementary metal oxide semiconductor field effect transistor (CMOS), or a photodetector. The CCD, as one of digital cameras, is a device of storing digital data in a storing medium such as a flash memory and the like by converting an image into an electric signal by using a charge-coupled device (CCD), and has excellent image quality as compared with a CMOS type camera, but is disadvantageous in aspects to power consumption and costs. On the contrary, the CMOS is a low power consumption type image pick-up element having a complementary metal oxide semiconductor (CMOS) structure and uses about $\frac{1}{10}$ of the power as compared to the charge-coupled device (CCD) and a single power supply of 3.3V, and may be integrated with a peripheral circuit.

The photodetector may be an element for converting an absorbed light signal or light energy into an electric signal or electric energy. In the exemplary embodiment, the photodetector may be an element for converting a light signal or light energy received from the surrounding environment of the vehicle into electric energy capable of measuring the risk.

The information acquiring sensor 100 may measure a distance from the vehicle to a surrounding object by using a laser or an ultrasound wave. The distance measurement using the laser or ultrasound wave may be used to acquire a distance by measuring a time taken to emit a short laser pulse of about a millionth of one second by using a pulsed laser and then reflect and return the emitted short laser pulse from an object at the velocity of light. The distance measurement may include a method of acquiring the distance by using a continuous wave laser, phase deviation or optical triangulation. The distance measurement using the ultrasound wave also measures the distance with the target object by the same principle as the distance measuring method using the laser.

The information acquiring sensor 100 may receive situation information from the surrounding vehicle or an infrastructure. In the exemplary embodiment, the information acquiring sensor 100 may receive information on velocity, a direction, and the like of the surrounding vehicle through communication with the surrounding vehicle to acquire the information, and may also receive position or state information of a facility transmitted from the infrastructure.

Figure 3A:
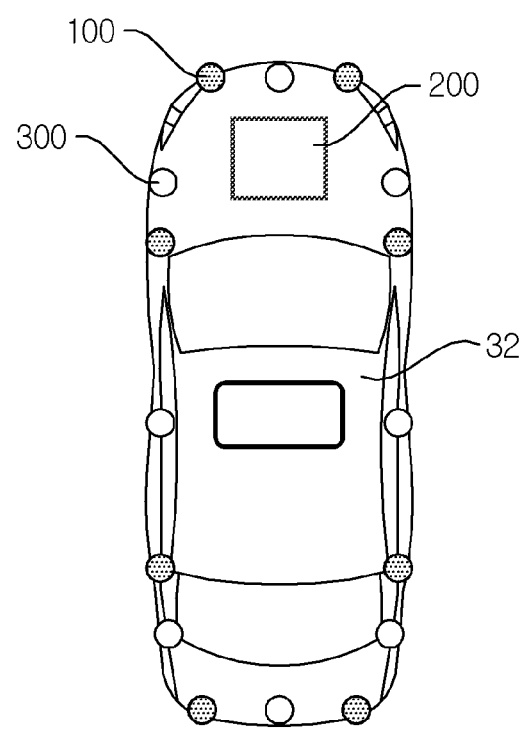

In the exemplary embodiment, at least one information acquiring sensor 100 may be attached to the outer surface of the vehicle to acquire the surrounding information, or only one information acquiring sensor may be attached to the outer surface of the vehicle as a fisheye type sensor. Referring to FIG. 3A or 3B, the information acquiring sensor 100 may be attached to the front, the side, and the rear of the vehicle. In the exemplary embodiment, the information acquiring sensor 100 may be attached to a position without incurring a dead zone where the information acquiring sensor cannot acquire the surrounding information with a minimum of numbers.

The color change controller 200 measures a risk of the accident by using the information acquired from the information acquiring sensor 100 and controls color emission of the vehicle. The color change controller 200 includes a risk measuring unit 210 and a color determining unit 220.

The risk measuring unit 210 determines a risk through the acquired surrounding information and dynamic information including velocity, acceleration, and a direction relating to the driving of the vehicle. The risk measuring unit 210 determines how high is the possibility that a dangerous situation such as a collision will occur after a predetermined time based on various information acquired from the information acquiring sensor 100 and the current dynamic information of the vehicle.

The dynamic information may be information including all states relating to the motion of the vehicle. In the exemplary embodiment, the dynamic information may include velocity, acceleration, and a driving direction relating to the driving of the vehicle. The risk is information indicating possibility of an accident of the vehicle and may be information determined by considering possibility of a collision, a remaining time up to a collision, or the like in consideration of the vehicle surrounding information acquired from the information acquiring sensor 100 and the current dynamic information of the vehicle.

The color determining unit 220 determines what color is expressed by using a predetermined algorithm for selecting a color to be expressed according to the risk measured in the risk measuring unit 210. The color determining unit 220 may further include a position recognizing unit 222.

The position recognizing unit 222 determines whether the possibility of a risk situation is high at any position around the vehicle by considering the acquired surrounding information and the determined risk. In the exemplary embodiment, a position having a high risk or a position where a risk of a threshold or more is determined may be recognized based on the risk measured from the risk measuring unit 210. The position may be directions including up, down, left, and right based on the vehicle. The determined position where the possibility of the risk situation is high may be a 2D or 3D position determined on the basis of determining a risk corresponding to a position of the surrounding information acquired from the information acquiring sensor 100 in the risk measuring unit 210.

The color determining unit 220 may determine which color will be expressed for each position by using a predetermined algorithm according to the position determined in the position recognizing unit 222 and the risk determined in the risk measuring unit 210.

The predetermined algorithm may be an algorithm for determining an emitting color and an emitting position in the color emitting unit 300 according to the risk. In the exemplary embodiment, the color determined according to the risk may be a color which is easily recognized by a surrounding vehicle or a pedestrian, as the risk is higher when classifying the risk for each step. A color having high brightness or a chroma may be selected, and a color having high visibility because of a high contrast with a color of the surrounding information according to the surrounding information acquired in the information acquiring sensor 100 may be selected.

Figure 2:
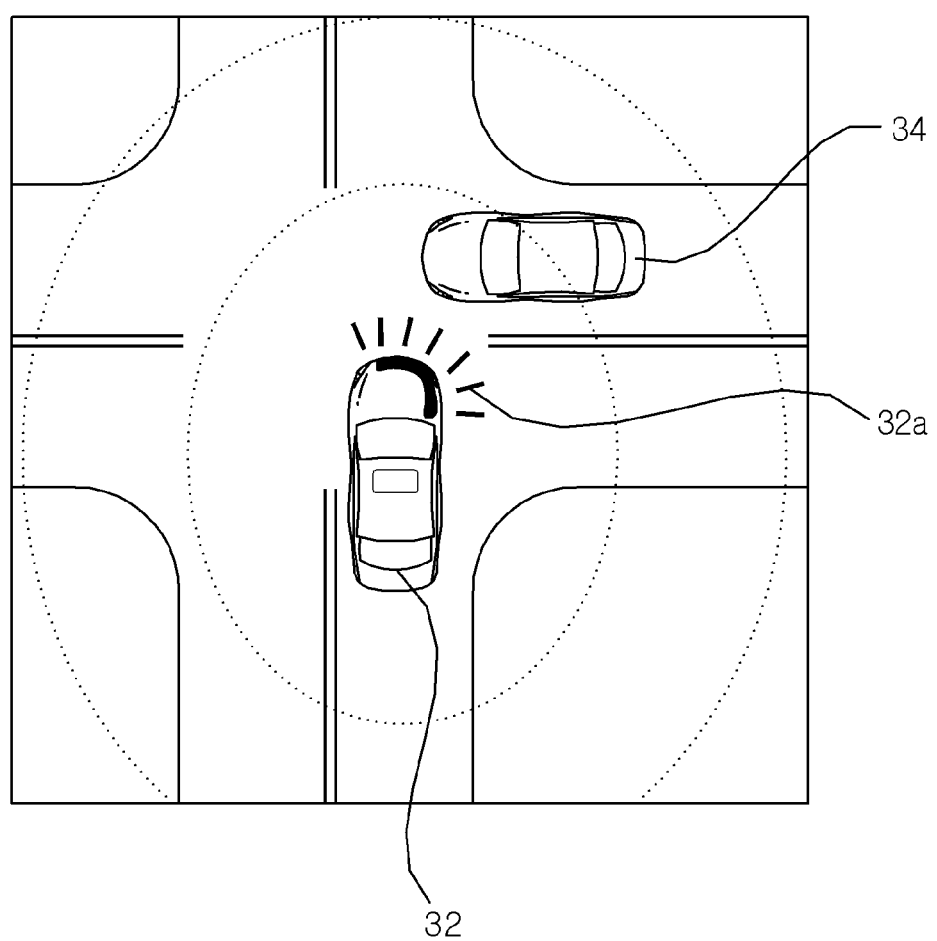
FIG. 2 is an exemplified diagram illustrating an operation example of the system of changing a vehicle color according to the risk according to an exemplary embodiment of the present invention.

The determining of the emitting position may be to determine a portion of the vehicle corresponding to the position determined in the position recognizing unit 222 as described above. Referring to FIG. 2, one vehicle 34 progressing at the right based on a user's vehicle 32 was detected, and a high collision risk was measured by the risk measuring device. As a result, the predetermine algorithm determines a red color alarming a high risk as the emitting color and determines the right and the front 32a of the user's vehicle corresponding to the right vehicle 34 as the emitting position to emit the color. Accordingly, both the user and a driver of the vehicle 34 progressing at the right thereof may recognize the situation and takes proper measurement to avoid a collision.

The color emitting unit 300 expresses the color determined in the color determining unit 220. The color emitting unit 300 may be attached to the outside of the vehicle or included in the vehicle by replacing a part forming the appearance of the vehicle.

In the case where the color emitting unit 300 is attached to the outside of the vehicle, a plurality of color emitting units may be attached to the outside as a small component, the color emitting unit may be partially attached to the appearance of the vehicle, or the color emitting unit may partially replace the portion forming the appearance of the vehicle.

In the exemplary embodiment, in the case where the plurality of color emitting units are attached to the outside as a small component, as shown in FIG. 3A, the color emitting units may be attached to the front, the rear, and the side thereof. In the case where the color emitting unit is partially attached to the appearance of the vehicle, as shown in FIG. 3B, a transparent layer 310a capable of transmitting light may be further included on the outside of the vehicle, and the color emitting unit 300 may be disposed at the lower portion 310b of the transparent layer. In the case where the color emitting unit 300 is attached to the appearance of the vehicle together with the transparent layer 310a, in the exemplary embodiment, a thin layer made of a transparent material is attached to the cover of the vehicle in the related art to usually maintain a state which is not different from a general vehicle, and in the case where the risk situation is expected, a specific color may be expressed outside by transmitting the light from the inside of the transparent layer. In the case where the color emitting unit partially replaces the portion forming the appearance of the vehicle, a part made of a material capable of transmitting light is put in a bonnet, a door, a trunk, or other parts configuring the appearance of the vehicle to represent usually a printed color, but in the case where the light is transmitted inside, a color determined in the color determining unit 220 may be exposed.

Figure 4:
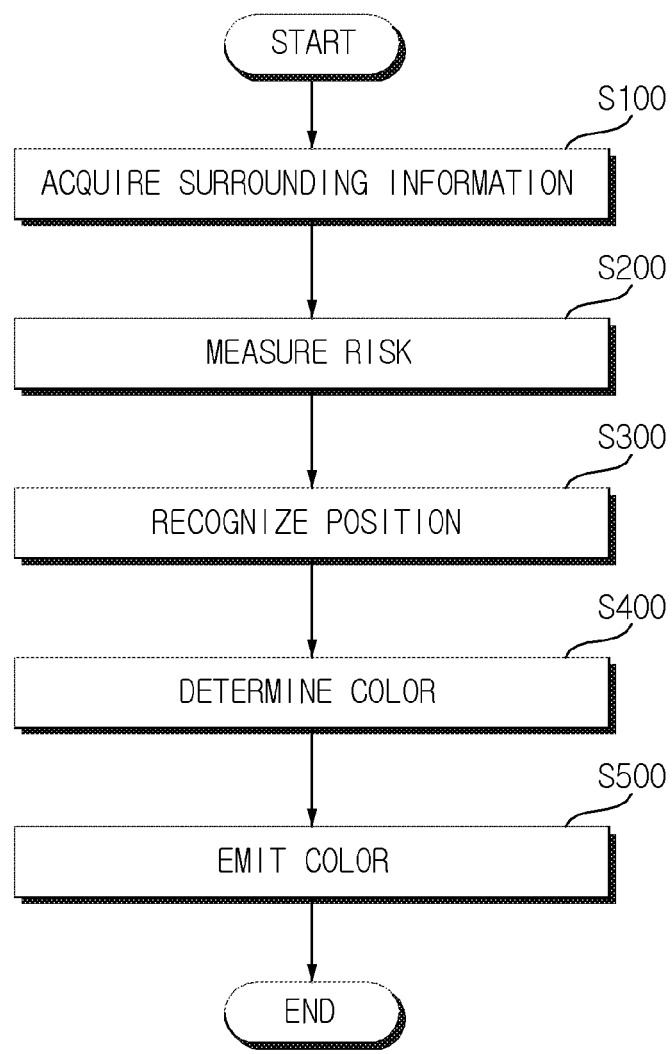
FIG. 4 is a flowchart illustrating a method of changing a vehicle color according to a risk according to another exemplary embodiment of the present invention.

FIG. 4 is a flowchart illustrating a method of changing a vehicle color preformed in the system 1 of changing the vehicle color according to a risk according to the exemplary embodiment of the present invention.

Referring to FIG. 4, the method of changing a vehicle color according to a risk according to the exemplary embodiment includes acquiring surrounding information (S100), measuring a risk (S200), recognizing a position (S300), determining a color (S400), and emitting a color (S500).

The acquiring of the surrounding information (S100) acquires surrounding information including relative distance, position, and direction angle information with a surrounding environment of a vehicle, in the information acquiring sensor 100.

The measuring of the risk (S200) determines a risk through the surrounding information acquired in the acquiring of the surrounding information (S100) and dynamic information including velocity, acceleration, and a direction relating to the driving of the vehicle, in the risk measuring unit 210.

The recognizing of the position (S300) determines whether the possibility of a risk situation is high at any position around the vehicle by considering the acquired surrounding information and the determined risk, in the position recognizing unit 222.

The determining of the color (S400) determines which color will be expressed for each position by using a predetermined algorithm according to the position determined in the recognizing of the position (S300) and the risk determined in the measuring of the risk (S200), in the color determining unit 220.

As described above, the predetermined algorithm may be an algorithm for determining an emitting color and an emitting position in the emitting of the color (S500) according to the risk. In the exemplary embodiment, the color determined according to the risk may be a color which is easily recognized by a surrounding vehicle or a pedestrian, as the risk is higher when classifying the risk for each step. A color having high brightness or a chroma may be selected, and a color having high visibility because of a high contrast with a color of the surrounding information according to the surrounding information acquired in the acquiring of the surrounding information (S100) may be selected.

The determining of the emitting position may be to determine a portion of the vehicle corresponding to the position determined in the recognizing of the position (S300) as described above.

The emitting of the color (S500) expresses the color determined in determining a color (S490), in the color emitting unit 300. As described above, the color emitting unit 300 may be attached to the outside of the vehicle or included in the vehicle by replacing a portion forming the appearance of the vehicle.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system of changing a color of a vehicle, comprising:
an information acquiring sensor configured to acquire surrounding information including information of a relative distance, position, and direction angle with respect to a surrounding environment of the vehicle;
a risk measuring unit configured to measure a risk through the acquired surrounding information and through dynamic information including a velocity, acceleration and a driving direction of the vehicle;
a plurality of color emitting units disposed at a plurality of positions arranged around the vehicle, each color emitting unit being controllable to emit light in a plurality of colors; and
a color determining unit configured to determine any of the plurality of positions at which the risk is higher than a threshold, and to determine, for each determined high-risk position, one of the plurality of colors in which the color emitting unit at said each position emits the light, based on the acquired surrounding information and the measured risk.

2. The system of changing a vehicle color of claim 1, wherein the information acquiring sensor acquires image information by using a charge-coupled device (CCD), a complementary metal oxide semiconductor field effect transistor (CMOS), or a photodetector.

3. The system of changing a vehicle color of claim 1, wherein the information acquiring sensor measures a distance up to a surrounding object by using a laser or an ultrasound wave.

4. The system of changing a vehicle color of claim 1, wherein the information acquiring sensor receives situation information from a surrounding vehicle or an infrastructure.

5. The system of changing a vehicle color of claim 1, wherein the information acquiring sensor is attached to an outside of the vehicle to acquire the surrounding information.

6. The system of changing a vehicle color of claim 1, wherein each of the plurality of color emitting units is attached to the vehicle or forms a portion of the vehicle.

7. The system of changing a vehicle color of claim 6, wherein if one of the color emitting units is attached to the vehicle, the vehicle further includes a transparent layer capable of transmitting light on an outside of the vehicle, and the color emitting unit is disposed at a lower portion of the transparent layer.

8. The system of claim 1, wherein the plurality of positions arranged around the vehicle are arranged at the front, the rear and two sides of the vehicle.

9. A method of changing a color of a vehicle according to a risk, comprising:
- an information acquiring step of acquiring surrounding information including information of a relative distance, position, and direction angle with respect to a surrounding environment of the vehicle;
- a risk measuring step of measuring the risk through the acquired surrounding information and through dynamic information including a velocity, acceleration and a driving direction of the vehicle;
- a color determining step of determining any of a plurality of color emitting positions arranged around the vehicle at which the risk is higher than a threshold, and determining, for each determined high-risk position, one of a plurality of colors in which a color emitting unit at said each position emits light, based on the acquired surrounding information and the measured risk; and
- a color emitting step of the color emitting unit at each determined high-risk position emitting the light in the determined color.

10. The method of changing a vehicle color of claim 9, wherein the information acquiring step includes acquiring image information by using a charge-coupled device (CCD), a complementary metal oxide semiconductor field effect transistor (CMOS), or a photodetector.

11. The method of changing a vehicle color of claim 9, wherein the information acquiring step includes measuring a distance up to a surrounding object by using a laser or an ultrasound wave.

12. The method of changing a vehicle color of claim 9, wherein the information acquiring step includes receiving situation information from a surrounding vehicle or an infrastructure.

13. The method of changing a vehicle color of claim 9, wherein the information acquiring step includes acquiring the surrounding information through at least one information acquiring sensor that is attached to the vehicle.

14. The method of changing a vehicle color of claim 9, wherein each of the color emitting units is attached to the vehicle or forms a portion of the vehicle.

15. The method of changing a vehicle color of claim 14, wherein if one of the color emitting units is attached to the vehicle, the color emitting step further includes emitting the light through a transparent layer formed on an outside of the vehicle, the one color emitting unit being disposed at a lower portion of the transparent layer.

16. The method of claim 9, wherein the plurality of color emitting positions arranged around the vehicle are arranged at the front, the rear and two sides of the vehicle.

* * * * *